Oct. 9, 1928.
1,686,522
H. G. HARTMAN
GEAR CUTTING MACHINE
Filed Nov. 30, 1926
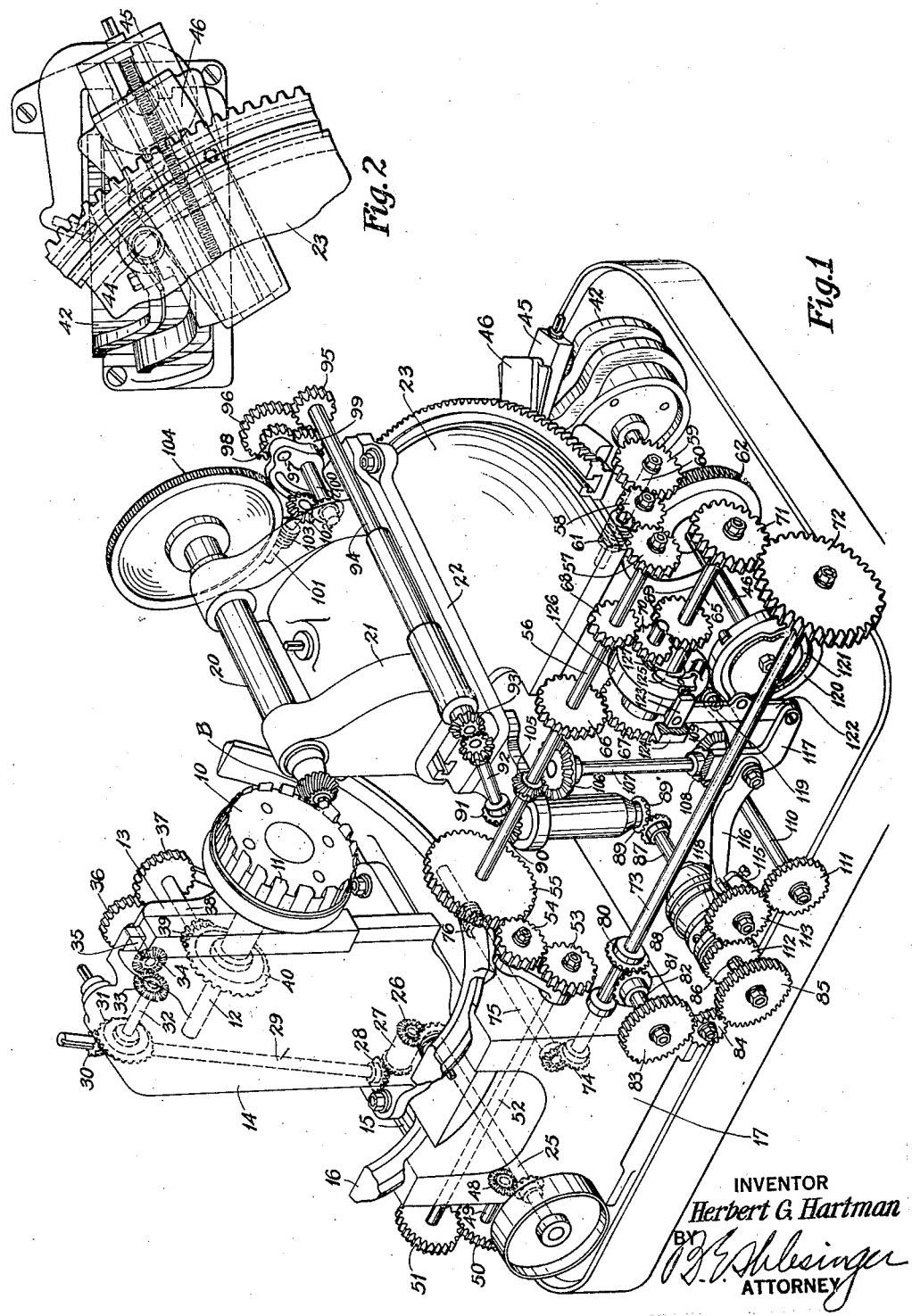
INVENTOR
*Herbert G. Hartman*
BY
ATTORNEY Patented Oct. 9, 1928.

1,686,522

UNITED STATES PATENT OFFICE.

HERBERT G. HARTMAN, OF ROCHESTER, NEW YORK, ASSIGNOR TO GLEASON WORKS, OF ROCHESTER, NEW YORK, A CORPORATION OF NEW YORK.

GEAR-CUTTING MACHINE.

Application filed November 30, 1926. Serial No. 151,774.

The present invention relates to machines for producing gears and particularly to machines of the intermittent or periodic indexing type, employing a rotary annular face mill for cutting longitudinally curved tooth gears.

The purpose of this invention is to provide a machine which will enable the cutting of all the teeth of a gear alike and thus permit of producing mating gears which will run together smoothly and without noise.

In the machine of the type referred to, the tool is first rotated in engagement with the blank to produce a tooth or tooth space on the blank, then the tool and blank are relatively separated or disengaged, the blank is then indexed and the tool and blank are then re-engaged so that the tool operates upon a new tooth or tooth space of the blank. The relative separation of tool and blank and the indexing of the blank takes place after each tooth or tooth space has been cut. The cutting, withdrawal, indexing and return constitute one cycle of operation of the machine.

Heretofore, the means for imparting the periodic relative movement of separation between tool and blank has been actuated by gearing selected merely to cause the separation and return at the correct time in the cycle, without regard to the speed of rotation to the tool or the position of the cutting blades at the beginning of operation on the different teeth. In the present invention the gears which actuate the means for causing the relative separation and return are chosen not only with a view to securing the relative separation and return at the correct time in the cycle but are selected also with reference to the speed of rotation of the tool so as to have the tool always in the same position at the commencement of operation on any tooth, that is, so as to have the same cutting blade of the tool commence to cut on each tooth of the blank. The selection of the gears in this manner permits of cutting all of the teeth of the blank alike, with the consequence that gears produced on a machine constructed according to this invention will run together very quietly and smoothly.

The purpose of this invention is accomplished by selecting the gears controlling the relative separation and return with reference to the gears governing the speed of rotation of the tool, so that the tool will make an integral number of revolutions during each cycle of machine operation and consequently will always be in the same position at the commencement of the cut upon each different tooth or tooth space of the blank. In the preferred embodiment of the invention, a set of speed change gears are incorporated in the train driving the cutter spindle and a set of feed change gears are included in the train which drives the cam which controls the periodic relative separation between tool and blank, and the two sets of change gears are so chosen relatively to each other that the tool will make an integral number of rotations for each revolution of the cam.

The principal objects of my invention have already been described. Other objects will be apparent hereinafter from the specification and the recital of the appended claims.

A preferred embodiment of my invention is illustrated in the accompanying drawing, in which:

Figure 1 is an isometric view of a spiral bevel gear generating machine in which the present invention is embodied; and Figure 2 is an enlarged fragmentary plan view, showing the connection between the feed cam and the blank support.

The present invention is described hereinafter as embodied in one type of machine for producing spiral bevel gears, but it will be understood that it is employable on other types of bevel gear generating machines and in fact on any type of machine for producing gears employing a rotary tool and in particular on machines employing rotary tools having a plurality of equi-spaced cutting blades. The present application is intended to cover any uses, modifications, or adaptations of the invention which may fall within the scope of the invention or the limits of the appended claims.

In the machine illustrated, a rotary annular face mill 10 is employed. This tool 10 is provided with a plurality of spaced cutting blades 11. The tool 10 is secured to a spindle 12 which is journaled in a support 13 which is vertically adjustable upon a standard 14 that is horizontally adjustable upon a cradle 15 which is provided with guide rails 16 which move in V-shaped ways in the base 17 of the machine.

The blank B is secured to a spindle 20 which is journaled in a blank head 21 which is adjustable upon the blank head carrier 22. The blank head carrier is in turn angularly adjustable upon the frame or support 23 which, in the machine illustrated, is mounted for angular movement upon a stationary part formed integral with or secured to the base 17.

In setting up the machine illustrated for operation, the tool and blank are first adjusted by means of the adjustments described to bring tool and blank into proper cutting position. The tool is then rotated in engagement with the blank. If the tooth profiles are to be generated, a relative rolling movement is imparted between tool and blank by oscillation of the cradle and in timed relation therewith, during cutting, rotation of the blank spindle. After a tooth or tooth space has been cut, the tool and blank are disengaged,—in the machine illustrated by an angular movement of the blank support 23 on the base. The blank is then indexed, the tool and blank are then returned into engagement by the return movement of the blank support 23 and the tool then operates upon a new tooth or tooth space of the blank.

The tool rotates continuously on its axis during the operation of the machine, being driven from the main drive shaft 25 by means of the miter gears 26, the shaft 27, the miter gears 28, the shaft 29 which has a splined connection with the bevel pinion 30, the bevel pinion 30 and the bevel gear 31 which meshes therewith, the shaft 32, the bevel gears 33 and 34, the shaft 35, the speed change gears 36 and 37, the shaft 38, the bevel pinion 39 and the bevel gear 40 which meshes therewith and which is secured to the tool spindle 12.

The periodic relative disengagement of tool and blank accomplished by the pivotal movement of the blank support 23 is controlled by means of a feed cam 42 which is operatively connected to the blank support and which, in the embodiment illustrated, is driven from the main drive shaft 25. The feed cam 42 is provided with a cam slot on its periphery so constructed that in one revolution of the cam, the machine completes one operating cycle.

The cam groove cooperates with a pin 44 secured to the lever 45 which is pivotally mounted on the base. The lever 45 is adjustably connected by means of a usual block and stud connection with an arm 46 which is secured to the frame 23. The cam holds the blank in engagement with the cutter for a sufficient period to permit the completion of one cutting operation and then withdraws the blank for a period long enough to permit the latter to be indexed.

The cam 42 is secured to a cam shaft 46 which is journaled in the base and which is driven from the main drive shaft 25 by means of the miter gears 48, the shaft 49, the feed change gears 50 and 51, the shaft 52, the spur gears 53, 54 and 55, the shaft 56, the spur gears 57, 58 and 59, the shaft 60, the worm 61 carried thereby, and the worm wheel 62 which meshes with the worm and which is secured to the cam shaft 46.

Heretofore, the speed change gears 36 and 37 have been selected so as to give any desirable speed of rotation to the tool and the feed change gears 50 and 51 have been chosen simply to impart the desired rate of rotation to the feed cam 42 so that the blank will be disengaged from the tool, returned into engagement with the tool, and held in engagement therewith, during the proper portions of the cycle of operation. The feed change gears and the speed change gears were selected entirely without regard to each other. As a consequence, one blade of the tool might be the first to come into engagement with one tooth of the blank and another blade might be the first to engage some other tooth of the blank. In this way, the same blade might cut in different places on different teeth of the blank.

Now the blades 11 are detachable from the cutter head 10 and they must be adjusted on said cutter head so that all the edges which cut one side of a tooth move in the same circular path. If there is any error in the adjustment of the blades, it is reflected in the teeth cut. Heretofore, a high or low spot caused by an inaccurate adjustment of a blade would occur on different parts of the profile of different teeth because the same blade was cutting on different parts of the profile on different teeth. This made it extremely difficult if not impossible to detect which of the cutting blades was set inaccurately, while the occurrence of a high or low spot on different parts of the profiles of different teeth is of a source of noise in the operation of mating gears.

The advance in the present invention consists in so selecting the speed and the feed change gears relatively to each other that the tool rotates at a speed relative to the rotation of the cam such that the same cutting blade is always in position to engage a tooth of the blank at the commencement of each cutting operation whereby the blades always operate on the same parts of the profiles of the different teeth. With this arrangement of gearing, any error in the adjustment of a cutting blade can be detected immediately, and corrected, since the high or low spots caused by this error in setting will occur in the same places on each of the teeth. In a machine employing the present invention, all the teeth of a gear will be cut alike and when that gear is in mesh with a similarly cut gear the engagement and roll of the teeth of one gear upon another will be extremely smooth and quiet.

The purpose of the present invention is accomplished in the machine illustrated by so selecting the feed change gears 50 and 51 with relation to the speed change gears 36 and 37 that the tool 10 will make an integral number of revolutions during one rotation of the cam 42, whereby the tool 10 will make an integral number of revolutions during one cycle of operation of the machine and so the blades of the tool will always be in the same position in the same part of the cycle of operation upon any tooth.

In the machine illustrated, the generation of the tooth profiles is obtained through a movement of the cradle 15 on its axis and a rotation of the blank B on its axis. The cradle movement is derived from the shaft 56 through a reversible shaft 65 which may be driven in opposite directions from the shaft 56 by means, on the one hand, of a pair of spur gears 66 and 67 or, on the other hand, of spur gears 68 and 69 and the idler 70. The reversible shaft 65 carries a spur gear 71 which meshes with a spur gear 72 which is secured to a cross shaft 73 which is journaled in the base. The shaft 73 drives, through the miter gears 74, the worm shaft 75 which carries a worm 76 which meshes with a worm wheel segment (not shown) which is secured to the cradle 15.

The rotary movement of the blank spindle, during cutting, is also derived from the shaft 56 through the reversible shaft 65, the reversible shaft driving, as already described, the cross shaft 73 through the gears 71 and 72 and the cross shaft 73 carrying a miter gear 80 which meshes with a miter 81 which is secured to a shaft 82. The shaft 82 carries adjacent its outer end a spur gear 83 which meshes with a spur gear 84 which in turn meshes with a spur gear 85 secured to a shaft 86. The spur gears 83, 84 and 85, constitute a set of ratio change gears governing the ratio of roll between blank and cradle, while the spur gears 71 and 72 constitute a set of roll change gears governing the amount of the roll. The shaft 86 is connected with an aligned shaft 87, by means of a set of differential gears (not shown) which are housed within the differential housing 88. The shaft 87 drives the vertical shaft 89, about the axis of which the pivotal movement of the blank support 23 takes place, through the miter gears 89'. The shaft 89 carries a bevel gear 90 which meshes with a bevel gear 91 which is secured to the diagonal shaft 92 which drives through the miter gears 93, the telescoping shaft 94. The shaft 94 carries a spur gear 95 which meshes with a spur gear 96 which is mounted upon a stub shaft 97 which also carries a spur gear 98 which meshes with a spur gear 99 on the shaft 100. The gears 95, 96, 98 and 99 form a set of index change gears governing the number of teeth to be cut on the blank. The shaft 100 drives a worm shaft 101 through a pair of miter gears 102. Secured to the worm shaft 101 is a worm 103 which meshes with a worm wheel 104 which is fastened to the blank spindle 20. Through the gearing described, the blank is rotated in timed relation with the movement of the cradle during the cutting operation, to generate the tooth profiles.

After the blank has been disengaged from the cutter by the pivotal movement of the blank support 23, it will be indexed. In the machine illustrated, an additional algebraic rotation is periodically imparted to the blank spindle for the purpose of indexing the blank. This additional rotation may increase or decrease the ordinary cutting rotation of the blank spindle so as to accelerate or retard the same. The additional algebraic rotation is derived from the shaft 56. This shaft carries intermediate its length a bevel pinion 105 which meshes with a bevel gear 106 secured to a vertical shaft 107 which carries adjacent its lower end a bevel pinion 108 which meshes with a bevel gear 109 upon the horizontal shaft 110. The shaft 110 carries adjacent its outer end a spur gear 111 which drives the spur gear 112 by means of the spur gear 113. The spur gear 112 is adapted to be periodically connected with the differential housing 88, this connection occurring during the time the blank is disengaged from the tool. The operative connection of the spur gear 112 with the differential housing 88 causes an increase or decrease in the speed of rotation of the shaft 87, thus increasing or decreasing the speed of rotation of the blank spindle and the blank carried thereby and thus indexing the blank.

During the cutting operation, the differential housing 88 is locked against rotation. The means for locking the differential housing against rotation during cutting and the means for connecting the spur gear 112 with this housing periodically may be of any suitable form. In general, the machine illustrated is constructed and operates in the same way as the machine described in the copending application of Ernest C. Head, Serial No. 113,532, filed June 3, 1926, being capable, therefore, of producing gears of highest accuracy in tooth spacing and profile.

One of the locking levers for the differential housing is shown on the drawings of the present application in released position. This lever is indicated at 115. For withdrawing this lever from locking position, a bell crank lever 116 is employed, as in the machine of the application referred to. The bell crank lever 116 is pivotally mounted upon an arm 117 which is secured to the base of the machine. The bell crank lever 116 carries on one end a block 118 which engages with the locking lever 115 and on the other end a roller 119 which rides on the periphery of the cam disc 120.

The cam disc 120 is secured on the cam shaft 46 and a lug or nose on the periphery of this cam disc is adapted to engage the roller 119 once in each rotation of the shaft 46 to rock the lever 116 and withdraw the locking lever 115 from locking engagement with the differential housing 88 to permit of the indexing operation. The indexing operation is thus controlled from the cam shaft 46.

The direction of rotation of the reversible shaft 65 is also controlled from the cam shaft 46, the cam disc 120 being provided on its face with a cam groove 121 which cooperates with a roller secured to a lever arm 122 which is pivotally mounted on the stationary bracket 117 and which is pivotally connected with a slide 123 which governs the reversal of the shaft 65. The slide 123 moves in a guide 124 secured to the base. This slide 123 carries at its opposite end rollers, of which only one is shown, which are adapted to engage the pawls 125 which are pivotally mounted on either side of the disc 126 and which are adapted respectively to alternately engage ratchet teeth 127 which are formed on the sleeves of the gears 69 and 67. The disc 126 is secured to the shaft 65 and the sliding of the slide 123 under actuation of the lever 122 and cam 121 causes this disc to be coupled alternately with the gear 67 and with the gear 69, thus periodically reversing the direction of rotation of the shaft 65 and of the cradle and main drive to the blank which are actuated from this shaft 65. This mechanism forms one type of reversing mechanism, (described more particularly in U. S. Patent No. 1,203,608, Gleason et al., November 7, 1916) of which any usual or suitable type may be employed on the machine described.

The present invention has been described in connection with a machine employing an indexing mechanism of the universal or worm and worm wheel type. It will be understood, however, that it is applicable also to machines on which a notched plate index and indexing mechanism is used, the essential purpose of the present invention being to so time the cutter rotation in the cycle of operation that the blades of the cutter always cut in the same places, that is on the same parts of the profiles of all the teeth of the blank.

The present invention is not restricted to machines employing annular face mills, but may be used also where a disc milling cutter is employed. Indeed, since it is always desirable to produce all the teeth of a gear under the same conditions, the present invention may be employed advantageously also even where tools having a continuous operating surface are used, as, for instance, in grinding machines and the term "tool" as employed in the claims is intended to cover both tools having a plurality of cutting blades and tools having a continuous uninterrupted operating surface.

With the present invention gears will be cut more accurately, since an immediate check is afforded to enable the prompt detection and correction of any serious error in the setting of the cutter blades; the spacing from tooth to tooth on a gear will be the same on all parts of the profile and mating gears will always mesh in the same way though different teeth be in engagement at different times. This invention, therefore, makes for more accurate, more smoothly running, and more quiet gears.

While I have described my invention in connection with a specific structure, it is to be understood that the invention is capable of various further modifications, adaptations and uses, without departing from the intent of the invention or the scope of the following claims, and that this application is intended to cover any adaptations or embodiments, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a gear cutting machine of the periodically indexing type, a tool support, a blank support, a rotary cutter, having a plurality of equidistantly spaced cutting blades arranged on its periphery, rotatably mounted on said tool support, means for imparting a continuous rotary movement to the tool, means for periodically effecting a relative separation between the tool and blank to permit of indexing the blank, and gearing governing the operation of said last named means, said gearing being so selected as to permit of the tool making an integral number of revolutions during each cycle of operation of the machine whereby the same blade of the cutter commences to cut at the beginning of operation on each tooth of the blank.

2. In a gear cutting machine of the periodically indexing type, a tool support, a blank support, a rotary annular cutter having a plurality of equidistantly spaced cutting blades arranged on its periphery, rotatably mounted on said support, means for imparting a continuous rotary movement to the tool, means for periodically effecting a relative separation between the tool and blank supports to permit of indexing the blank, and gearing governing the operation of said last named means, said gearing being so selected as to permit of the tool making an integral number of revolutions during each cycle of operation of the machine whereby the same blade of the cutter commences to cut at the beginning of operation on each tooth of the blank.

3. In a gear cutting machine of the periodically indexing type, a tool support, a blank support, a blank spindle journaled in said blank support, a rotary cutter having a plurality of equidistantly spaced cutting blades arranged on its periphery, rotatably mounted on said tool support, means for imparting a relative rolling motion between the tool and blank to generate the tooth profiles during cutting, means for periodically indexing the blank, means for periodically effecting a relative separation between the tool and blank supports to permit of indexing the blank, and gearing governing the operation of said last named means, said gearing being so selected as to permit of the tool making an integral number of revolutions during each cycle of operation of the machine whereby the same blade of the cutter commences to cut at the beginning of operation on each tooth of the blank.

4. In a gear cutting machine of the periodically indexing type, a tool support, a blank support, a blank spindle journaled in said blank support, a rotary annular cutter, having a plurality of equidistantly spaced cutting blades arranged on its periphery, rotatably mounted on said tool support, means for imparting a relative rolling motion between the tool and blank supports to generate the tooth profiles during cutting, means for periodically indexing the blank, means for periodically effecting a relative separation between the tool and blank supports to permit of indexing, and gearing governing the operation of said last named means, said gearing being so selected as to permit of the tool making an integral number of revolutions during each cycle of operation of the machine whereby the same blade of the cutter commences to cut at the beginning of operation upon each tooth of the blank.

5. In a machine for producing gears, a tool support, a blank support, a tool spindle journaled in said tool support, a rotary cutter, provided with a plurality of spaced cutting blades, mounted on said tool spindle, a main drive shaft, gearing connecting said main drive shaft to the tool spindle including a set of change gears governing the speed of rotation of the tool, means for periodically indexing the blank, a cam and a cam shaft for periodically effecting a relative separation between the tool and blank support to permit of indexing the blank and for returning the tool and blank into engagement for operation on another tooth, and gearing connecting said main drive shaft with said cam shaft, including a set of change gears, said change gears being so proportioned to the change gears governing the rotation of the tool that the tool makes an integral number of revolutions during each rotation of the cam shaft.

6. In a machine for producing gears, a tool support, a blank support, a tool spindle journaled in said tool support, a rotary annular cutter, provided with a plurality of spaced cutting blades mounted on the tool spindle, a main drive shaft, gearing connecting said main drive shaft to the tool spindle including a set of change gears governing the speed of rotation of the tool, means for periodically indexing the blank, a cam and a cam shaft for periodically effecting a relative separation between the tool and blank supports to permit of indexing the blank and for returning the tool and blank into engagement for operation on another tooth, and gearing connecting said cam shaft with said main drive shaft including a set of change gears, said change gears being so proportioned to the change gears governing the rotation of the tool that the tool makes an integral number of revolutions during each rotation of said cam shaft.

7. In a machine for producing gears, a tool support, a blank support, a tool spindle journaled in said tool support, a rotary annular tool mounted on said tool spindle, means for imparting a relative rolling movement between the tool and blank supports to generate the tooth profiles, means for periodically imparting an indexing motion to the blank, means for rotating the tool spindle including a set of change gears, a shaft, means operated thereby for periodically effecting a relative separation between the tool and blank supports to permit of indexing the blank, means operated from said shaft for governing the rolling movement, means operated from said shaft governing the indexing of the blank, and gearing for rotating said shaft, including a set of change gears so proportioned to the change gears governing the rotation of the tool spindle that the tool makes an integral number of revolutions during each cycle of operation of the machine.

8. In a machine for producing gears, a tool support, a blank support, a tool spindle journaled in said tool support, a rotary cutter, provided with a plurality of spaced cutting blades, mounted on the tool spindle, means for imparting a relative rolling movement between the tool and blank to generate the tooth profiles, means for periodically imparting an indexing movement to the blank, means for rotating the tool spindle including a set of change gears, a shaft, means operated thereby for periodically effecting a relative separation between the tool and blank supports to permit of indexing the blank, means operated from said shaft governing the rolling movement, means operated by said shaft for controlling the indexing of the blank, and means for rotating said shaft including a set of change gears so proportioned to the change gears governing the rotation of the tool spindle that the tool makes an integral number of revolutions during each cycle of operation of the machine.

9. In a machine for producing gears, a blank support, a blank spindle journaled therein, a tool support, a tool spindle journaled therein, a rotary annular tool mounted on the tool spindle, an oscillatory cradle upon which one of said supports is mounted, gearing for driving the tool spindle, a shaft, means actuated by rotation of said shaft for oscillating the cradle, means for periodically indexing the blank, means actuated by rotation of said shaft for periodically effecting a relative separation between the tool and blank supports to permit of indexing, and means driving said shaft including a set of change gears so selected relative to the gears driving the tool spindle that the tool makes an integral number of revolutions during each cycle of operation of the machine.

10. In a machine for producing gears, a blank support, a blank spindle journaled therein, a tool support, a tool spindle journaled therein, a rotary tool, provided with a plurality of spaced cutting blades, mounted on the tool spindle, an oscillatory cradle upon which one of said supports is mounted, gearing for driving the tool spindle, a shaft, means actuated by rotation of said shaft for oscillating the cradle, means for periodically indexing the blank, means actuated by rotation of said shaft for periodically effecting a relative separation between the tool and blank supports to permit of indexing, and means driving said shaft including a set of change gears so selected relative to the gears driving the tool spindle that the tool makes an integral number of revolutions during each cycle of operation of the machine.

11. In a machine for producing gears, a blank support, a blank spindle journaled therein, a tool support, a tool spindle journaled therein, a rotary annular tool mounted on the tool spindle, an oscillatory cradle upon which one of said supports is mounted, means for driving the tool spindle including a set of change gears governing the speed of rotation of the tool, a cam shaft, a cam mounted thereon having an operative connection with one of said supports for periodically effecting a relative separation between said supports, means operated from said cam shaft for controlling the movement of the cradle, means for rotating the blank spindle in timed relation with the cradle during cutting, means for periodically indexing the blank, and means for driving said cam shaft including a set of change gears so proportioned to the change gears governing the speed of rotation of the tool that the tool makes an integral number of revolutions for each rotation of the cam shaft.

12. In a machine for producing gears, a blank support, a blank spindle journaled therein, a tool support, a tool spindle journaled therein, a rotary tool, provided with a plurality of spaced cutting blades, mounted on the tool spindle, an oscillatory cradle upon which one of said supports is mounted, means for driving the tool spindle including a set of change gears governing the speed of rotation of the tool, a cam shaft, a cam mounted thereon having an operative connection with one of said supports for periodically effecting a relative separation between said supports, means operated from said cam shaft for controlling the movement of the cradle, means for rotating the blank spindle in timed relation with the cradle during cutting, means for periodically indexing the blank, and means for driving said cam shaft including a set of change gears so proportioned to the change gears governing the speed of rotation of the tool that the tool makes an integral number of revolutions for each rotation of the cam shaft.

13. In a machine for producing gears, a tool support, a blank support, a blank spindle journaled in said blank support, a tool spindle journaled in said tool support, a rotary annular tool mounted on said tool spindle, an oscillatory cradle upon which one of said supports is mounted, a main drive shaft, gearing connecting said main drive shaft with the tool spindle including a set of change gears governing the speed of rotation of the tool, an auxiliary shaft, means actuated by the rotation of said auxiliary shaft for periodically effecting a relative separation between said tool and blank supports, a reversible shaft, gearing operatively connecting said reversible shaft with the cradle, means actuated by rotation of said auxiliary shaft for controlling the direction of rotation of the reversible shaft, gearing operatively connecting the reversible shaft with the blank spindle for rotating the blank spindle in timed relation with the cradle during cutting, means for periodically imparting an additional algebraic movement to the blank spindle during the relative separation of tool and blank support to index the blank, means for locking said last named means against operation during cutting, means operated from said auxiliary shaft for controlling said locking means, and gearing connecting said auxiliary shaft with said main drive shaft including a set of change gears so proportioned to the change gears governing the rotation of the tool spindle that the tool makes an integral number of revolutions during each cycle of operation of the machine.

14. In a machine for producing gears, a blank support, a blank spindle journaled therein, a tool support, a tool spindle journaled therein, a rotary cutter, provided with a plurality of spaced cutting blades, mounted on the tool spindle, an oscillatory cradle upon which one of said supports is mounted, a main drive shaft, gearing connecting the main drive shaft with the tool spindle including a set of change gears governing the speed of rotation of the tool, an auxiliary shaft, means actuated by rotation of said auxiliary shaft for periodically effecting a relative separation between the tool and blank supports, a reversible shaft, gearing operatively connecting said reversible shaft with the cradle, means actuated by rotation of said auxiliary shaft for controlling the direction of rotation of the reversible shaft, gearing operatively connecting the reversible shaft with the blank spindle for rotating the blank spindle in timed relation with the cradle during cutting, means for periodically imparting an additional algebraic rotation to the blank spindle during the relative separation of tool and blank supports to index the blank, means for locking the last named means against operation during cutting, means operated from said auxiliary shaft for controlling said locking means, and gearing connecting said auxiliary shaft with said main drive shaft including a set of change gears so proportioned to the change gears governing the rotation of the tool that the tool makes an integral number of revolutions during each cycle of operation of the machine.

15. In a machine for producing gears, a blank support, a blank spindle journaled therein, a tool support, a tool spindle journaled therein, a rotary annular tool mounted on the tool spindle, an oscillatory cradle upon which one of said supports is mounted, a main drive shaft, gearing connecting said main drive shaft with the tool spindle including a set of change gears governing the speed or rotation of the tool, a cam shaft, a cam mounted thereon having an operative connection with one of said supports for periodically effecting a relative separation between said supports, a reversible shaft, gearing operatively connecting the reversible shaft with the cradle, a second cam on said cam shaft governing the direction of rotation of the reversible shaft, gearing operatively connecting said reversible shaft with the blank spindle for rotating the blank spindle in timed relation with the cradle during cutting, means for periodically imparting an additional algebraic rotation to the blank spindle during the relative separation of the tool and blank supports to index the blank, means for locking said last named means against operation during cutting, additional cam means carried by said cam shaft for governing said locking means, and gearing connecting said cam shaft with said main drive shaft including a set of change gears so proportioned relative to the change gears governing the speed of rotation of the tool that the tool makes an integral number of revolutions during one rotation of the cam shaft.

16. In a machine for producing gears, a blank support, a blank spindle journaled therein, a tool support, a tool spindle journaled therein, a rotary cutter, provided with a plurality of spaced cutting blades, mounted on the tool spindle, an oscillatory cradle upon which one of said supports is mounted, a main drive shaft, gearing connecting said main drive shaft with the tool spindle including a set of change gears governing the speed of rotation of the tool, a cam shaft, a cam mounted thereon having an operative connection with one of said supports for periodically effecting a relative separation between said supports, a reversible shaft, gearing operatively connecting the reversible shaft with the cradle, a second cam on said cam shaft governing the direction of rotation of the reversible shaft, gearing operatively connecting the reversible shaft with the blank spindle for rotating the blank spindle in timed relation with the cradle during cutting, means for periodically imparting an additional algebraic rotation to the blank spindle during the relative separation of the tool and blank supports to index the blank, means for locking said last named means against operation during cutting, additional cam means carried by said shaft for governing said locking means, and gearing connecting said cam shaft with said main drive shaft including a set of change gears so proportioned to the change gears governing the speed of rotation of the tool that the tool makes an integral number of revolutions during each rotation of the cam shaft.

HERBERT G. HARTMAN.